G. A. NISSEN.
DRIVE CONNECTION FOR SICKLE BARS.
APPLICATION FILED APR. 10, 1907.
934,690.
Patented Sept. 21, 1909.
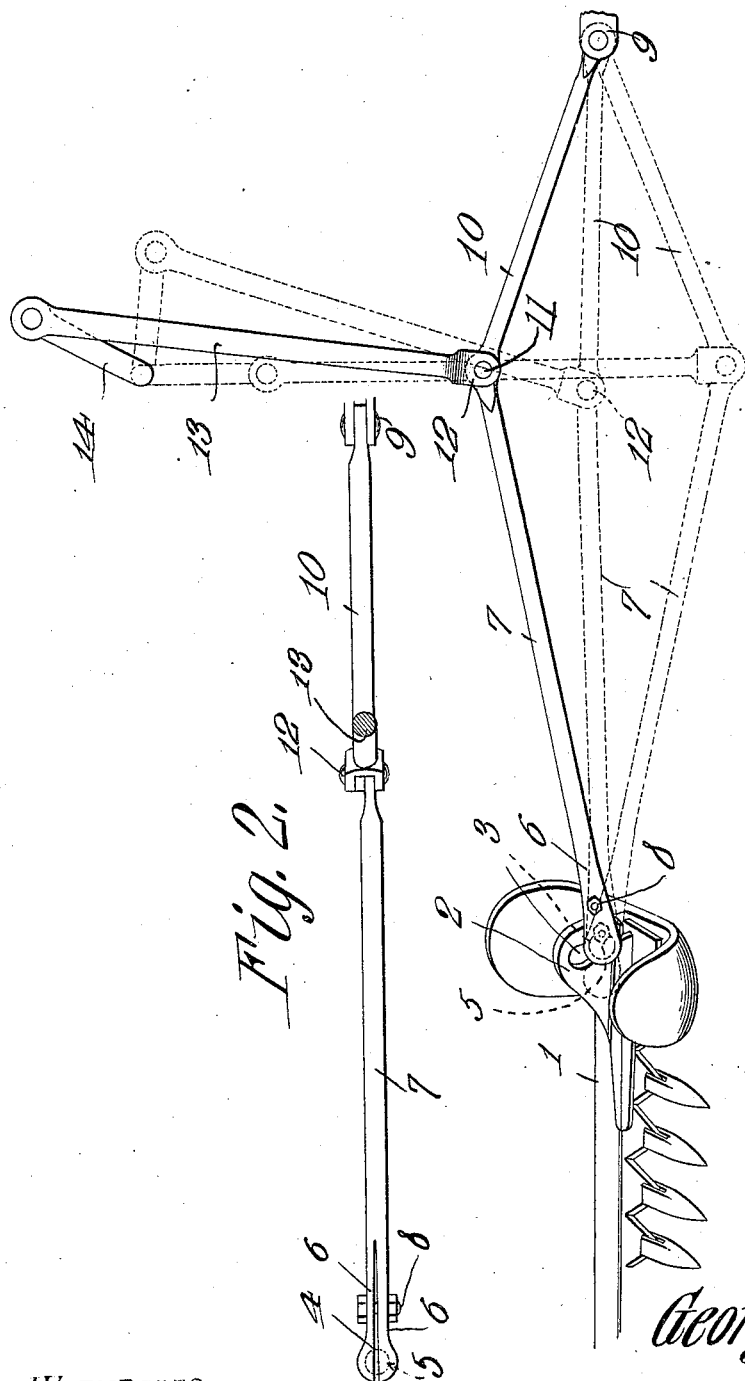
George A. Nissen,
INVENTOR.
By C. A. Snow & Co.
ATTORNEYS.
WITNESSES:

UNITED STATES PATENT OFFICE.

GEORGE A. NISSEN, OF KLEMME, IOWA, ASSIGNOR TO NISSEN CO-OPERATIVE PATENT CO., OF KLEMME, IOWA.

DRIVE CONNECTION FOR SICKLE-BARS.

934,690.  Specification of Letters Patent.  Patented Sept. 21, 1909.

Application filed April 10, 1907. Serial No. 367,315.

*To all whom it may concern:*

Be it known that I, GEORGE A. NISSEN, a citizen of the United States, residing at Klemme, in the county of Hancock and State of Iowa, have invented a new and useful Drive Connection for Sickle-Bars and the Like, of which the following is a specification.

This invention relates to harvesting machines, and more particularly to mechanism for transmitting motion from a revoluble element to a sickle bar, whereby said bar can be reciprocated without producing unnecessary jolting and noise.

Another object is to provide simple and efficient mechanism of this character, the parts of which will not readily get out of order, said mechanism being formed of few parts.

With these and other objects in view the invention consists of certain novel details of construction and combinations of parts hereinafter more fully described and pointed out in the claim.

In the accompanying drawings the preferred form of the invention has been shown.

In said drawings:—Figure 1 is an elevation of the mechanism, the sickle bar connected thereto being shown in perspective. Fig. 2 is a plan view of the driving mechanism, the pitman being shown in section.

Referring to the figures, by characters of reference, 1 designates the sickle bar of a harvesting machine, which, as ordinarily, is capable of tilting to a slight extent relative to the balance of the machine, this sickle bar being provided at one end with an upstanding wing 2 formed with openings 3, one of which is designed to receive a ball 4, which projects beyond opposite faces of the wing and is designed to be seated within sockets 5 formed in the inner or adjoining faces of the terminal portions of arms 6 extending longitudinally beyond one end of a rod 7. A bolt 8 extends transversely through the arms 6, and by tightening this bolt the socketed portions of the arms can be caused to firmly grip upon those portions of the ball which project beyond the opposite faces of wings 2. It is of course understood that this wing works between the arms 6.

A bracket 9 is secured to a fixed portion of the machine and a rod 10 is pivoted at one end to this bracket, while its other end is pivotally connected to one end of the rod 7. The pivot-pin 11 on which the connected ends of rods 7 and 10 are mounted extends through a fork 12 located at one end of the driving pitman 13 of the mechanism, said pitman being mounted at its other end upon a crank 14 or other driving element.

Inasmuch as the bracket 9 is fixed relative to the other portions of the mechanism herein described, it will be apparent that when the crank 14 is rotated by means of the ordinary or any preferred mechanism utilized for that purpose, the pitman 13 will be oscillated and reciprocated as indicated by dotted lines in Fig. 1, and the rods 7 and 10 will act as a toggle, and shift the sickle bar 1 longitudinally in one direction until one half the stroke of the pitman has been produced, whereupon further movement of the pitman in the same direction will cause reverse movement of the sickle bar as will be clearly apparent by referring to the dotted positions of the parts in Fig. 1. It will thus be seen that during each rotation of the crank 14 four movements of the sickle bar are produced. Moreover, by reason of the peculiar construction of the driving mechanism shown in Fig. 1 each movement of the sickle bar will begin and end gradually, and a large proportion of the noise and jolting which is ordinarily produced in machines of this character is thus eliminated.

By loosening the bolt 8 the arms 6 can be spread apart, so as to release the ball 4, and said ball can be placed in another one of the openings 3 and the parts then reassembled. This adjustment is often both necessary and desirable in machines of this character, particularly during the operation of assembling the parts upon the frame of the machine.

What is claimed is:—

The combination with a reciprocating element having an upstanding wing provided with a plurality of apertures, of a ball seated within and extending beyond opposite ends of one of said apertures, an oscillating actuating member having a forked end embracing the wing and movable relatively thereto, said forked end having opposed sockets for engaging the projecting portions of the ball, and means extending transversely through said forked portion for holding it in engagement with the ball.

In testimony that I claim the foregoing as my own, I have hereto affixed my signature in the presence of two witnesses.

GEORGE A. NISSEN.

Witnesses:
R. M. DAY,
F. A. ARNOLD.